Patented July 8, 1952

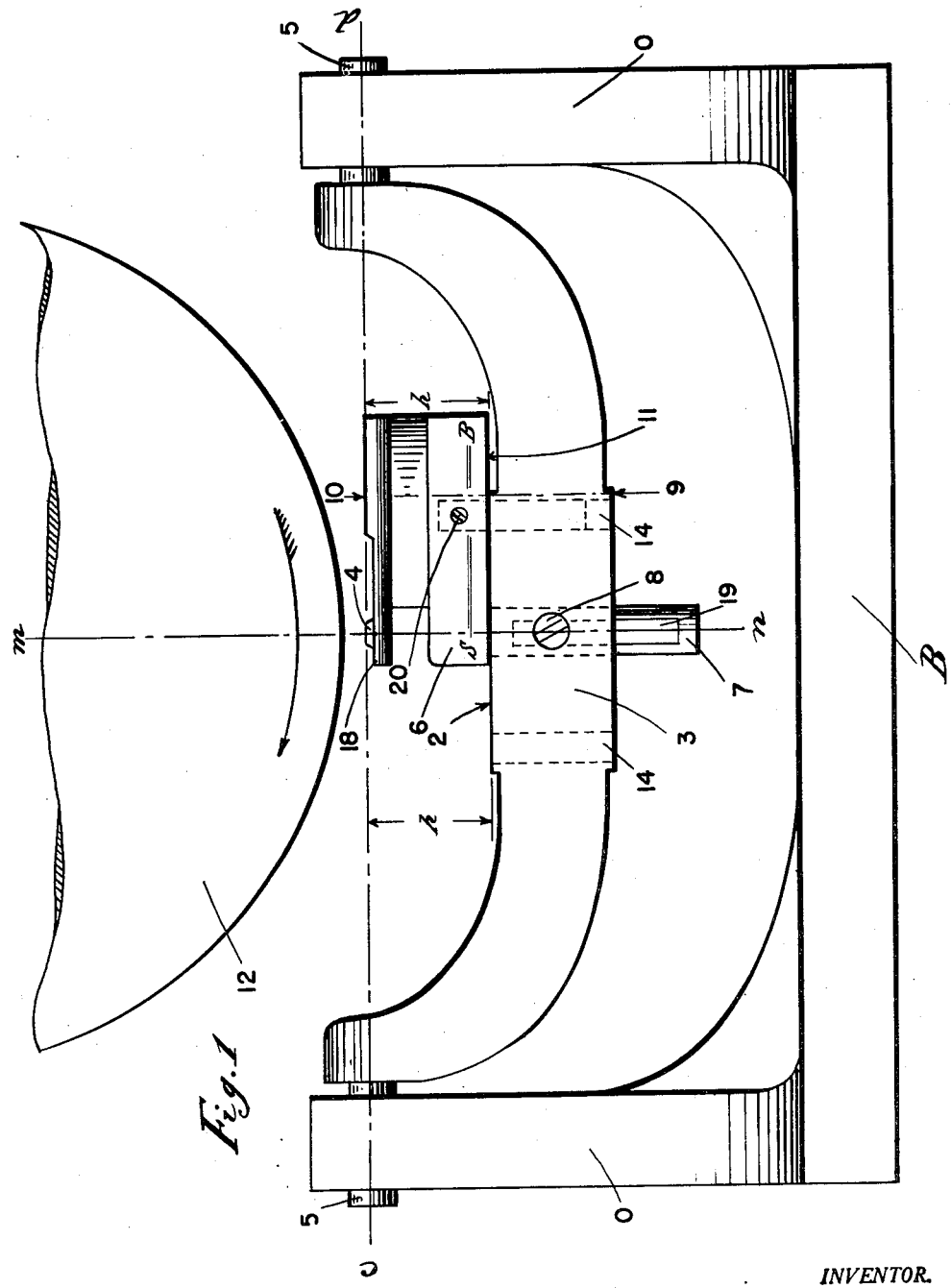

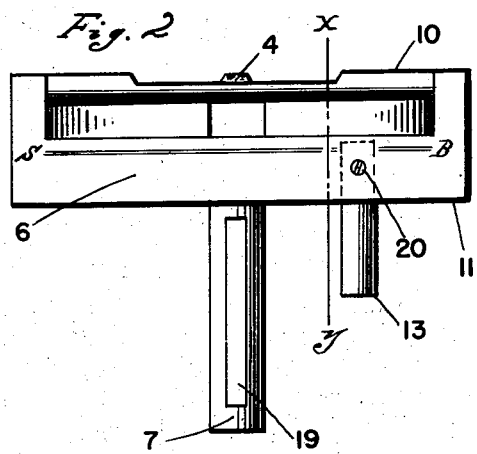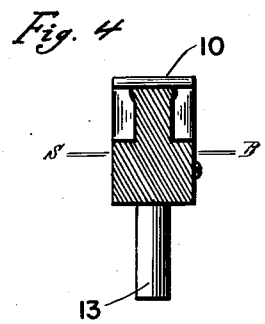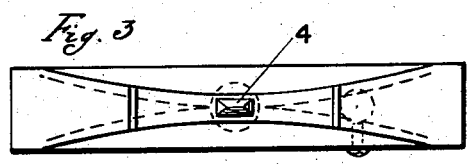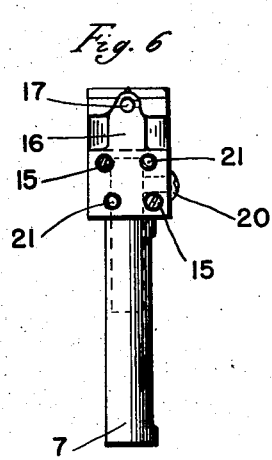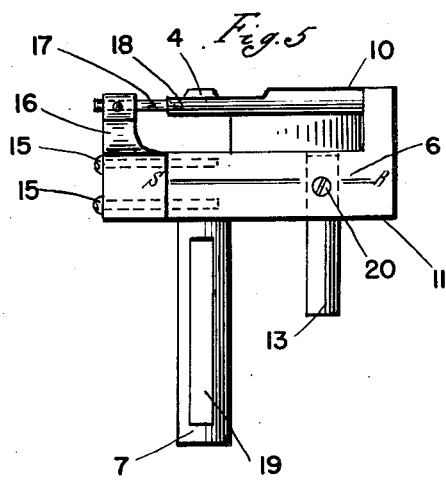

2,602,439

UNITED STATES PATENT OFFICE 2,602,439

DIAMOND HOLDING TOOL FOR CUTTING CONCAVE GRINDING WHEEL FACE

Walter Muench, Newark, N. J., assignor to Walter Muench, Incorporated, Newark, N. J., a corporation of New Jersey Application July 2, 1947, Serial No. 758,636

9 Claims. (Cl. 125—11)

My invention relates to diamond holding tool-propers which are used to produce precision concave radii of a half-circle (180 degree) sweep in grinding wheels operated in connection with surface grinding machines in tool-rooms.

The improvement of the concave cutting diamond tools consists in the development of a secondary support base for the purpose to provide self-gauging means and by the use of calculated fixed dimensions it is made possible that size-blocks be applied for setting-up to cut concave radii in grinding wheels.

A further improvement consists in the application of such mechanical functions so as to make the axial positioning of the concave cutting diamond tool-proper in the swinging arm of the radius dresser self-aligning.

An additional improvement of the concave radii cutting diamond tool-proper consists in providing a support-plate with a steadying-pin in front of the diamond holding arm.

Another improvement consists in the re-positioning of the locating shank for its vertical axial alignment in relation to the centrally seated cutting diamond.

To enable others, skilled in the art, to fully comprehend the underlying features of my invention, drawings, depicting a preferred form, have been annexed as a part of this disclosure and in these drawings similar reference characters denote corresponding parts throughout the several views, of which Fig. 1 is the side-view of a double-bearing support radius dresser with a diamond holding open-end tool-proper, which is provided with a secondary support-base, inserted in the swinging arm.

Fig. 2 is the side-view of a modified tool-proper with the secondary support-base and showing the application of the combined left- and right-side bridge-support for the centrally located cutting diamond.

Fig. 3 is a top-view of the same tool-proper shown in Fig. 2.

Fig. 4 is a cross-sectional view on the line X—Y of Fig. 2.

Fig. 5 is a side-view of a similar tool-proper as shown in Fig. 1, but now being provided with an attachable front-support plate, which carries a taper-pointed pin, the taper-point being engaged in a counter-shaped hole in the end of the diamond holding arm.

Fig. 6 is a left-end-view of the same tool-proper shown in Fig. 5, illustrating the details of fastening the end support-plate to the secondary support-base of the tool-proper.

Referring now to the drawings in which similar numerals refer to similar parts throughout the several views, it should be stated that the herein described improvements in concave radii cutting diamond tools are made for those tools which are used mainly in double bearing-support radius dressers, as illustrated in Fig. 1, constituting the base B and the left and right columns 0, 0; but if so desired, can, of course, be made adaptable for those diamond tool-propers as are used in single-bearing support radius dressers.

The diamond tool-proper 6 in Figure 1 is made in a precisely calculated height $h$—$h$, so that, measuring from the top marked 2 of the swinging arm 3, the cutting point of the diamond 4 is in perfect alignment with the horizontal $c$—$d$ through the centers of the bearing shafts 5—5, and is also in alignment with the vertical center axis $m$—$n$ through the locating shank 7 of the tool-proper 6.

In its zero position the bottom surface 11 of the tool-proper 6 rests on surface 2, and as the tool-proper 6 is solidly cast to the locating shank 7, the tool-proper 6 can be raised to whatever height is required for a desired radius.

Using a micrometer of a sufficient range to measure the height from the bottom surface 9 to the top surface 10, and assuming that it measured exactly 2.000 inches, then to set the tool-proper 6 to that position for the diamond to form-cut a ⅛" 180 degree concave radius in the periphery of a grinding wheel, it would be necessary to push the tool-proper 6 up by its shank 7 exactly .125 and lock it in this new position, with the set-screw 8 in the swinging arm 3. Checking with a 2 to 3 inch micrometer, the new, or rather, raised position should now read 2.125 inches between the bottom surface 9 and top surface 10.

However, micrometer measurements between 9 and 10 are made unnecessary with this newly developed diamond tool-proper, as its height $h$ is of a fixed, pre-calculated standard size, as previously explained, and is, therefore, self-gauging for any required concave radius-forming in grinding wheels—and by that is meant that all that is necessary to raise the tool-proper 6 a full .125" for an ⅛" concave radius is to slip a .125" size block between the surfaces 2 and 11 and lock in this position. The .125 size block is, of course, pulled out from between 2 and 11 after clamping.

If a 3/32" radius is desired in a grinding wheel, a size-block measuring .0937" is put between 2 and 11 and pulled out after locking shank 7 in position by the set screw 8.

In other words, always the same size-block as the size of the radius desired in the grinding wheel is put between the top surface 2 of the swinging arm and the bottom surface 11 of the tool-proper 6.

The concave radius-forming chisel-point diamond 4 in the tool-proper 6 must at all times be used in the proper position relative to the direction the grinding wheel runs when in the process of having a concave radius formed in its periphery, or left- or right corner edge.

When the grinding wheel 12 in Figure 1 revolves from right to left (clockwise), as indicated by the arrow, then the diamond holding end 18 must point in the same direction as the wheel revolves.

If the direction of revolution of the wheel would be reversed in Fig. 1, so that the wheel would turn from left to right (counter-clockwise), the tool-proper 6 would have to be completely turned around fully 180 degrees (half a turn) to conform to the direction of turning of the wheel, in order to prevent the diamond point from digging into the wheel and set up chatter and vibrations which, of course, will make a good and accurately-sized concave radius very difficult to produce in the grinding wheel.

The top measuring reference surface 10 of the tool-proper 6 is in exact height alignment with the cutting edge of the chisel-point diamond 4.

However, after many radii have been cut with the diamond, wear on the diamond may have reduced its height .002 to .005 below the top surface 10 of the tool-proper 6. To determine quickly and easily to what extent the diamond is reduced in height through wear is to clamp the tool-proper 6 in a V-block by its shank 7 and move an indicator with a large, blunt button across the diamond point 4 and then across the raised heel 10. The difference obtained shows the wear of the diamond, and if it happens to be .003, then a shim of .003 thickness will have to be added to the size block used between 2 and 11 for whatever radius is desired, so as to raise the diamond to the absolute accurate height in order to obtain the correct radius in the wheel.

In all cases it is, of course, best to make up the required combination of size blocks as a real foolproof means of setting up for a radius-dressing job.

In Figs. 1 to 6 is shown the arrangement of the secondary support-base S—B, with its re-located mounting-shank 7 for the aligned positioning of the shank 7 relative to the vertical axis through the center of the diamond 4.

In these figures is also illustrated the means for the self-centering of the tool-proper 6 when inserted by its shank 7 into the swinging arm 3 of the radius dresser, so that the chisel-point of the diamond 4 is always in perfect alignment with the axis c–d through the exact centers of the bearing shafts 5—5 of the radius dresser by providing the slide pin 13 which is held in the tool-proper 6 by the set-screw 20.

This slide pin 13 is of a sufficient length to be always engaged in one of the holes 14, 14, according to the position taken in the swinging arm 3 when the tool-proper 6 is raised by its shank 7 for cutting concave radii in grinding wheels.

Although a flat 19 is provided on the shank 7, so that the square end of the set-screw 8 could apply some sort of a squaring or aligning pressure on the whole tool-proper and with it on the diamond holding arm, but these means can never be relied on for perfect alignment.

With the aid of the auxiliary sliding pin 13, however, the overall perfect alignment of the diamond point relative to all the important axial functions in the radius dresser is thereby assured and may not vary more than plus or minus .0005, which is really the maximum limit allowable if accurate radii are expected in the grinding-wheels for precision tool-work.

To cut large concave radii, as for instance $\frac{1}{8}$, $\frac{3}{16}$ and $\frac{1}{4}''$ in a grinding wheel, the open end type of diamond holding tool-proper as shown in Fig. 1 is perfectly all right and in a way is even better than if the open end was covered up, as the wheel dust is thrown off more readily when cutting a large concave radius and besides, the heat set up in the diamond during the process of cutting deep into the periphery of the grinding wheel is dissipated more quickly in the surrounding air.

However, for cutting small concave radii as for instance $\frac{1}{32}''$, $\frac{3}{64}''$, $\frac{1}{16}''$, $\frac{5}{64}''$ and $\frac{3}{32}''$, the open space at the diamond holding arm 18 should be closed; by that is meant that the diamond holding arm 18, hanging free in the air, requires some sort of a support so that it will not break off or bend when under a wheel cutting a small radius, especially if the machine-operator is careless.

Now in order to give the free-hanging arm end 18 sufficient support for the small concave radii cutting tools, simple logic would resort to providing the tool-proper 6 in Fig. 1 with exactly the same diamond-arm support at the left side as is at the right side and a tool-proper of this sort is shown in Fig. 2 and Fig. 3.

At first glance this would seem the most practical solution to give support to the diamond-arm from both sides as far as the tools are concerned with which the small concave radii are cut into the periphery of a grinding wheel to the extent of a complete half circle (180 degree contour) or fractions thereof.

Regardless of what material is used for the concave radii cutting diamond tools of the double-end support type, whether it be cold rolled, machine- steel or tool-steel, when the chisel-point diamond is brazed in its nest provided in the center section shown in Fig. 2 and Fig. 3, stresses are set up in the metalic material when heating it to almost white heat with a silver-brazing torch and still more so later on during the cooling of it, so that the positioning of the diamond becomes greatly distorted.

The center section may sink in or it may rise and may even force itself into a diagonal position or a combination of these.

The chisel-point diamond after being silver-brazed in the arm 18, must be in perfect axial alignment with the rest of the functional parts of the tool-proper and the radius dresser, otherwise it cannot cut a perfect radius in a grinding wheel.

A chisel-point diamond should more so than any other be set and silver-brazed into a free-hanging arm of a tool-proper if it is expected to cut accurate concave radii in a grinding wheel.

The reason for this is that when the free-hanging arm is exposed to the heat of the brazing torch while the chisel-point diamond is secured in its nest, the free hanging arm 18 can set freely on cooling and take on a natural position as it was not restrained to expand towards the front and sides while under the brazing-flame.

These facts were gathered by experiment and observation with the resultant conclusion that only by this method can a perfect longitudinal axis alignment of the top cutting edge of the chisel-point diamond be accomplished.

How to support the free hanging arm 18 of the tool-proper 6, when the circular diameter of the free arm-end, at the spot where the chisel-point diamond is brazed in, is made for a small concave radius, is shown in Fig. 5 and Fig. 6.

The tool shown in Fig. 5 is in its general details similar to the tool shown inserted in the swinging dresser-arm 3 in Fig. 1 except that the tool shown in Fig. 5 is provided with a support-plate 16 in which is inserted, at the top, the taper-pointed pin 17, the point of which is pushed into a shallow counter-sunk hole provided for this purpose in the end-stem of the diamond holding arm 18.

As shown in Fig. 6, the support-plate 16 is fastened to the secondary base S—B of the tool-proper 6 by two screws 15, 15 and held in an immovable position by two dowel-pins 21, 21.

While I have illustrated and described my invention with some degree of particularity, I realize that in practice various alterations therein may be made. I, therefore, reserve the right and privilege of changing the form of the details and construction or otherwise altering the arrangement of the correlated parts without departing in any way from the spirit of the invention or the scope of the appended claims.

Having thus described my invention what I claim as new and desire to secure by United States Letters Patent is:

1. A carrier, a concave radii cutting chisel-point diamond mounted on said carrier and including a cutting edge, said carrier having a support-base including a gaging surface spaced a predetermined definite distance from said cutting edge, said base being provided with a depending cylindrical locating shank, said locating shank having its axis aligned with the center of the chisel-point diamond and also disposed to intersect the cutting edge of the diamond and a cylindrical alignment slide pin depending from the support base in parallel spaced relation to said locating shank and bearing a predetermined definite relationship to said shank and said cutting edge so that a mounting of said shank and pin will definitely place said cutting edge, said carrier including a gaging surface to one side of and at the initial non-worn height of the cutting edge, and said support base having a planar bottom surface spaced a predetermined definite distance from said gaging surface and of a length for extending opposite the position of the diamond and also said gaging surface to one side of the same, said carrier being undercut at the position of the diamond mounting to provide a resilient overhanging arm on which the diamond is fixed and which extends in a direction generally paralleling the planar bottom surface of the support-base and terminates in an end extremity equipped with a counter-sunk hole, an auxiliary end-support plate removably secured to the support base opposite said arm extension, said end support plate carrying a straight pin, and said straight pin having a tapered end extremity engaging in supporting contact in said counter-sunk hole.

2. A carrier, a concave radii cutting chisel point diamond mounted on said carrier and including a single elongated straight cutting edge adapted to be presented in tangential relation to the periphery of a wheel to be dressed, said carrier having a support base including a gaging surface spaced a predetermined definite distance from said cutting edge, said carrier including a gaging surface to one side of and at the initial non-worn height of the cutting edge, and said support base having a planar bottom surface paralleling and spaced a predetermined definite distance from said gaging surface and a length for extending opposite the position of the diamond and also said gaging surface to one side of the same, said carrier being undercut at the position of the diamond mounting to provide a resilient overhanging arm extension on which the diamond is fixed and which extends in a direction generally paralleling the planar bottom surface of the support-base and terminates in an end extremity equipped with a counter-sunk hole, an auxiliary end support plate removably secured to the support base opposite said arm-extension, said end support plate carrying a straight pin, and said straight pin having a tapered end extremity engaging in supporting contact in said counter-sunk hole.

3. In a device of the character described, a supporting base, an arcuate cradle having trunnion bearing on said base so as to be rockable opposite the periphery of a grinding wheel on which a concave radius is to be dressed, a diamond cutter carrier adjustably mounted on the cradle for movements of adjustment toward and from the periphery of said wheel and having a chisel point diamond thereon including a single elongated straight cutting edge adapted to be presented in tangential relation to the periphery of said wheel, said cradle and carrier having opposing gaging surfaces bearing parallel relation to each other and to the cutting edge and adapted at times to cooperatively engage and at such times bear a predetermined definite spaced relation to the cutting edge of the diamond effective to place said cutting edge at the axis of the cradle trunnion bearing, and said gaging surfaces being adapted to be spaced a predetermined distance apart by insertion of gaging means therebetween incidental to the adjustment of position of the diamond cutter to determine the radius to be dressed on the wheel by the cutter, said cutter carrier having a cylindrical mounting shank depending therefrom and adjustably mounted in a receiving bore in the cradle so that the diamond cutter can be moved toward or from the periphery of said wheel, and a second cylindrical shank depending from the carrier and slidably received in a bore in said cradle as a means for stabilizing the mounting of said carrier and diamond cutter, said shanks bearing a predetermined definite relationship to each other and to the cutting edge effective to accurately place said cutting edge in a predetermined position with relation to the axis of the trunnion bearing.

4. Apparatus as defined in claim 3 wherein the cradle is provided with a second bore in the same plane in which the other two shank receiving bores and the cutting edge are mounted and adapted for selectively receiving the second shank so that the cutting edge can be directed in one direction or the other according to the direction of rotation of the wheel to be dressed, and wherein the mounting shank is so placed that its axis intersects the center and cutting edge of the diamond cutter.

5. Apparatus as defined in claim 3 wherein the cradle is provided with a second bore in the same plane in which the other two shank receiving bores and the cutting edge are mounted and adapted for selectively receiving the second shank so that the cutting edge can be directed in one direction or the other according to the direction of rotation of the wheel to be dressed, and whereing the mounting shank is so placed that its axis intersects the center and cutting edge of the diamond cutter, the carrier also being undercut to provide a free end arm extension whereon said cutting edge is mounted.

6. An elongated generally rectangular carrier, a concave radii cutting diamond mounted on said carrier and including a single elongated straight cutting edge extending in the direction of the length of the carrier and adapted to be presented in tangential relation to the periphery of a wheel to be dressed, said carrier having a support base including a large area planar surface prepared to be suitable for accurate gaging contact with a gage block presented thereagainst and paralleling and spaced a predetermined definite distance from said cutting edge and facing in the opposite direction from said cutting edge, said base being provided with a depending locating shank projecting from said gaging surface, said locating shank having its axis aligned with the center of the diamond cutting edge, and also disposed to intersect the cutting edge of the diamond.

7. An elongated generally rectangular carrier, a concave radii cutting diamond mounted on said carrier and including a single elongated straight cutting edge extending in the direction of the length of the carrier and adapted to be presented in tangential relation to the periphery of a wheel to be dressed, said carrier having a support base including a large area planar surface prepared to be suitable for accurate gaging contact with a gage block presented thereagainst or a part of a micrometer gage and paralleling and spaced a predetermined definite distance from said cutting edge and facing in the opposite direction from said cutting edge, said carrier also including a gaging surface adjacent and to one side of and at the initial non-worn height of the cutting edge and paralleling and bearing constant predetermined definite spaced relation to the large area planar surface of the support base, a locating shank, depending from said support base and an alignment slide pin depending from the support base in parallel spaced relation to the locating shank and bearing a predetermined definite relationship to said locating shank and said cutting edge so that a mounting of said shank and pin will definitely place said cutting edge.

8. A carrier, a concave radii cutting chisel-point diamond mounted on said carrier and including a cutting edge, said carrier having a support-base including a gaging surface spaced a predetermined definite distance from said cutting edge, said base being provided with a depending cylindrical locating shank, said locating shank having its axis aligned with the center of the chisel-point diamond and also disposed to intersect the cutting edge of the diamond and a cylindrical alignment slide pin depending from the support base in parallel spaced relation to said locating shank, and bearing a predetermined definite relationship to said shank and said cutting edge so that a mounting of said shank and pin will definitely place said cutting edge, said carrier including a gaging surface to one side of and at the initial non-worn height of the cutting edge, and said support base having a planar bottom surface spaced a predetermined definite distance from said gaging surface, and of a length for extending opposite the position of the diamond and also said gaging surface to one side of the same, said carrier being undercut at the position of the diamond mounting to provide a resilient overhanging arm on which the diamond is fixed and which extends in a direction generally paralleling the planar bottom surface of the support-base.

9. In a device of the character described, a supporting base, an arcuate cradle having trunnion bearing on said base so as to be rockable opposite the periphery of a grinding wheel on which a concave radius is to be dressed, a diamond cutter carrier adjustably mounted on the cradle for movements of adjustment toward and from the periphery of said wheel and having a chisel point diamond thereon including a single elongated straight cutting edge adapted to be presented in tangential relation to the periphery of said wheel, said cradle and carrier having opposing gaging surfaces bearing parallel relation to each other and to the cutting edge and adapted at times to cooperatively engage and at such times bear a predetermined definite spaced relation to the cutting edge of the diamond, and said gaging surfaces being adapted to be spaced a predetermined distance apart by insertion of gaging means therebetween incidental to the adjustment of position of the diamond cutter to determine the radius to be dressed on the wheel by the cutter, said cradle and carrier gaging surfaces being so spaced from the trunnion bearing axis and the cutting edge of the diamond respectively as to be effective when they are in contact to place said cutting edge along the axis of the cradle trunnion bearing, said carrier including two gaging surfaces spaced one to each side and endwise of the cutting edge and initially coinciding in height with the cutting edge so as to be effective as marks of proper cutting edge height regardless of wearing away of said cutting edge, the opposing parallel gaging surfaces of the cradle and carrier being large area planar surfaces of a length for extending opposite the position of the diamond and also both of said gaging surfaces, one to each side of the cutting edge.

WALTER MUENCH.

REFERENCES CITED

The following references are of record in the file of this patent:

UNITED STATES PATENTS

| Number | Name | Date |
|---|---|---|
| 1,585,705 | Hanson | May 25, 1926 |
| 1,585,706 | Hanson | May 25, 1926 |
| 1,734,914 | Ott | Nov. 5, 1929 |
| 1,826,219 | Parker | Oct. 6, 1931 |
| 2,293,749 | O'Neill | Aug. 25, 1942 |
| 2,309,924 | Root | Feb. 2, 1943 |
| 2,366,623 | Jokobsen | Jan. 2, 1945 |
| 2,404,148 | Thompson | July 16, 1946 |
| 2,442,627 | Wainwright | June 1, 1948 |

FOREIGN PATENTS

| Number | Country | Date |
|---|---|---|
| 559,945 | Great Britain | Mar. 13, 1944 |
| 574,427 | Great Britain | Jan. 4, 1946 |